United States Patent
Chen

(10) Patent No.: US 9,910,245 B2
(45) Date of Patent: Mar. 6, 2018

(54) MANUALLY OPERATED REFLECTING DEVICE

(71) Applicant: E-LEAD ELECTRONIC CO., LTD., Changhua (TW)

(72) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 76 days.

(21) Appl. No.: 14/957,254

(22) Filed: Dec. 2, 2015

(65) Prior Publication Data

US 2017/0160516 A1 Jun. 8, 2017

(51) Int. Cl.
*G02B 7/182* (2006.01)
*G02B 27/01* (2006.01)

(52) U.S. Cl.
CPC ....... *G02B 7/1825* (2013.01); *G02B 27/0149* (2013.01); *G02B 2027/0154* (2013.01)

(58) Field of Classification Search
CPC .... B60R 1/04; G02B 7/1825; G02B 27/0149; G02B 2027/0154
USPC ................ 359/873, 841, 872, 632
See application file for complete search history.

(56) References Cited

U.S. PATENT DOCUMENTS

| | | | | |
|---|---|---|---|---|
| 8,209,816 B2* | 7/2012 | Heger | ............ | B60R 1/06 16/330 |
| 8,427,751 B2* | 4/2013 | Rumpf | ............ | G02B 27/0149 345/7 |
| 8,531,279 B2* | 9/2013 | DeLine | ............ | B60Q 3/023 340/425.5 |
| 2014/0146407 A1* | 5/2014 | Tseng | ............ | G02B 7/182 359/841 |
| 2014/0153123 A1* | 6/2014 | Hancock | ............ | B60R 1/06 359/872 |

* cited by examiner

*Primary Examiner* — Stephone B Allen
*Assistant Examiner* — Rahman Abdur
(74) *Attorney, Agent, or Firm* — Wang Law Firm, Inc.

(57) ABSTRACT

A manually operated reflecting device includes a base, at least one rotary sleeve pivoted to the base, and a release module and an angle-adjustment module disposed between the first and second rotary sleeves and the base. The release module and the angle-adjustment module allow the base to be adjusted and fixed at a certain angle with respect to the first and second rotary sleeves. On the rotary sleeve is disposed a reflecting member. The rotary sleeve is rotated and fixed at a predetermined angle with respect to the base, so as to maintain the reflecting member at a best-view position.

9 Claims, 10 Drawing Sheets

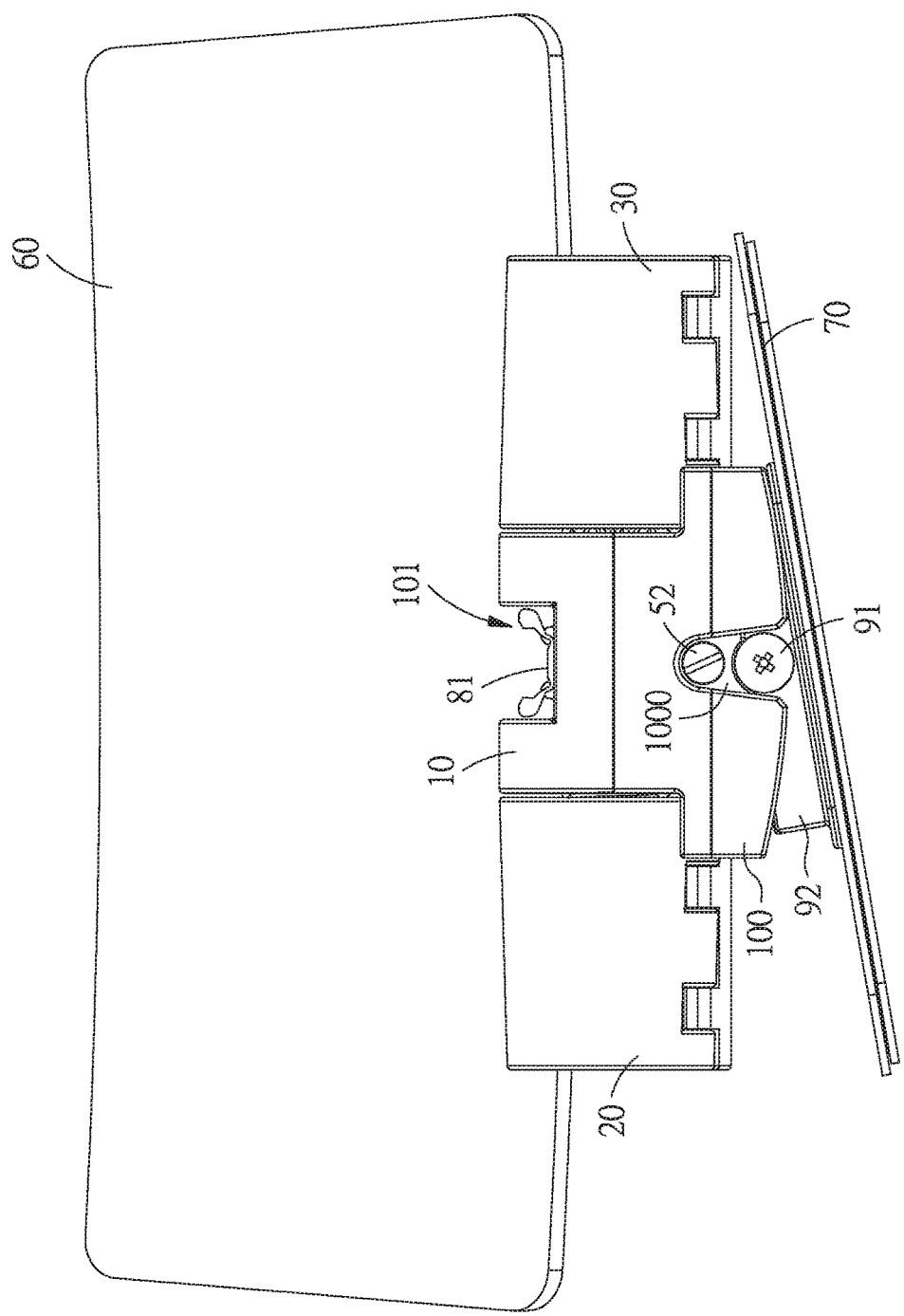

ized to *US 9,910,245 B2*

MANUALLY OPERATED REFLECTING DEVICE

BACKGROUND OF THE INVENTION

Field of the Invention

The present invention relates to a reflecting device used on a vehicle, and more particularly to a manually operated reflecting device with a rotation angle memory function, so that the reflecting member can be pivoted to a desired angle very quickly, which facilitates operation of the HUD system on the vehicle.

Related Prior Art

The current HUD (head up display) system used on a vehicle is an optical system and normally comprises: a projector and a combiner. The projector includes a signal light source, a projection lens and other optical elements. The signal light source includes LCD (liquid crystal display) or CRT (cathode ray tube). Light produced by the light source is projected by the projector onto the combiner (or a special transparent screen) on a glass, and then the combiner displays characters or images.

Normally, it would take at least 0.5 second for a driver to read the information on the dashboard, which is not safe while driving. Therefore, a lot of vehicles have been equipped with HUD in order to reduce distraction to the driver.

SUMMARY

An objective of the present invention is to provide a manually operated reflecting device with a rotation angle memory function.

Another objective of the present invention is to provide a manually operated reflecting device which is provided with a horizontal adjustment module to adjust the horizontal angle of the reflecting member.

To achieve the above objectives, a manually operated reflecting device, comprises: a base provided at one side thereof with a first recess and a first aperture, a damper is fixed in the first recess, the base is provided with a first fixing hole which is fixed to a first locking hole of a rotary shaft, so that the rotary shaft is fixed to the base with the extension portion protruded out of the base, and a first elastic member is sleeved onto the extension portion;

a first rotary sleeve is provided with a second aperture for insertion of the extension portion of the rotary shaft, the first elastic member has two ends fixed on the base and the first rotary sleeve, respectively, so as to provide an elastic rotating force;

a release module includes a release button on which being sleeved a second elastic member, an engaging member which is sleeved onto the release button and located at and driven by one end of the second elastic member, and an engaging shaft onto which being sleeved a third elastic member, the engaging shaft is disposed in a first aperture of the base;

a second rotary sleeve is provided at one end with a second recess for receiving the release button, and provided at another end thereof with a receiving chamber for receiving the engaging member;

a reflecting member provided at a lower edge thereof with an assembling portion which is fixed to the first rotary sleeve and the second rotary sleeve;

an angle-adjustment module includes an adjustment cover, an adjustment rod, and a threaded adjustment hole, the adjustment cover is attached to the first and second rotary sleeves, the adjustment is screwed through the adjustment hole to push against an adjustment portion of the adjustment cover to restrict angle; and a board is fixed to a bottom of the base.

Preferably, a locking module is disposed in the opening of the base and includes a locking portion and a connecting portion. The locking portion is disposed in the opening of the base, and the connecting portion is formed on the adjustment cover. When the reflecting member is not in use, the connecting portion of the adjustment cover is engaged with the locking portion of the locking module. To use the reflecting member, the user can press the reflecting member to disengage the connecting portion of the adjustment cover from the locking portion of the locking module, so that the reflecting member can be released from the locking position.

Preferably, a horizontal adjustment module which comprises: a horizontal fixing rod, a pivot block, at least one restricting seat, and a horizontal connecting seat, the horizontal connecting seat is provided with a horizontal adjustment hole, the pivot block is disposed on the base and provided with a pivot hole, the horizontal fixing rod is inserted in the horizontal adjustment hole and the pivot hole of the pivot block to adjust horizontal angle of the base.

BRIEF DESCRIPTION OF THE DRAWINGS

FIG. 10 is another operational view of the manually operated reflecting device in accordance with the second preferred embodiment of the present invention.

DETAILED DESCRIPTION

Figure 1:
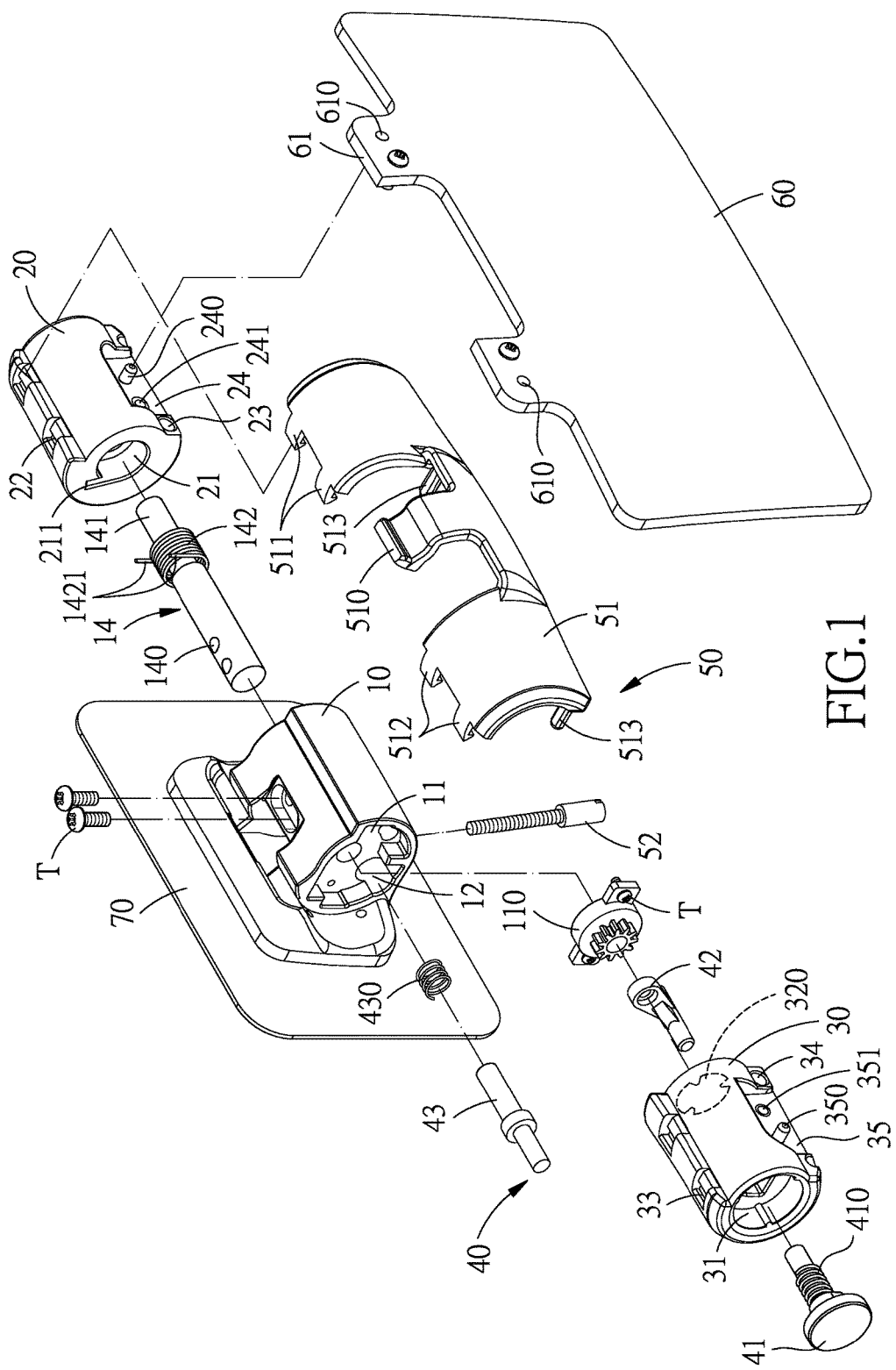
FIG. 1 is an exploded view of a manually operated reflecting device in accordance with the first preferred embodiment of the present invention.

The present invention will be clearer from the following description when viewed together with the accompanying drawings, which show, for purpose of illustrations only, the preferred embodiment in accordance with the present invention.

Referring to FIGS. 1-5, a manually operated reflecting device in accordance with a first preferred embodiment of the present invention comprises: a base 10, a first rotary sleeve 20 and a second rotary sleeve 30 at two sides of base 10, a release module 40 and an angle-adjustment module 50 disposed between the first and second rotary sleeves 20, 30 and the base 10, a reflecting member 60 attached to the first and second rotary sleeves 20, 30, and a board 70 fixed to a bottom of the base 10. The release module 40 and the angle-adjustment module 50 allow the base 10 to be adjusted and fixed at a certain angle with respect to the first and second rotary sleeves 20, 30. The first and second rotary sleeves 20, 30 are rotated and fixed at a predetermined angle with respect to the base 10, so as to maintain the reflecting member 60 at a best-view position.

The base 10 (approximately in the shape of a cylinder) is provided on one end surface thereof with a first recess 11 and a first aperture 12 eccentrically formed at the bottom of the first recess 11. A damper 110 driven by a toothed wheel is fixed in the first recess 11 by two screws T. On another end surface of the base 10 is provided a first fixing hole 13 with a first section and a second section which is bigger in diameter than the first section. At a bottom of the first fixing hole 13 is formed a first fixing groove 131. A rotary shaft 14 with two first locking holes 140 and an extension portion 141 is inserted in the first section of the first fixing hole 13, then two screws T are inserted through the peripheral wall of the first fixing hole 13 and screwed into the first locking holes 140 of the rotary shaft 14, so that the rotary shaft 14 is fixed to the base 10 with the extension portion 141 protruded out of the base 10. A first elastic member 142 (a torque spring) is sleeved onto the extension portion 141 and disposed in the second section of the first fixing hole 13, and the first elastic member 142 has two ends pressed against the first fixing hole 13 and the first rotary sleeve 20, respectively, to provide an elastic stress therebetween.

The first rotary sleeve 20 is provided at one end surface thereof with a second aperture 21 and a second fixing groove 211 formed in an inner surface of the second aperture 21. The second aperture 21 has a first section and a second section which is larger in diameter than the first section. The extension portion 141 of the rotary shaft 14 is inserted in the first section of the second aperture 21, and the first elastic member 142 is received in the second section of the second aperture 21. At least one first engaging groove 22 is formed on an outer surface of the first rotary sleeve 20, and at least one first inserting hole 23 and a first assembling recess 24 with a flat bottom are formed on the outer surface of the first rotary sleeve 20 and located opposite the first engaging groove 22. At the bottom of the first assembling recess 24 are provided a first protrusion 240 and a second fixing hole 241.

The release module 40 includes a release button 41 on which being sleeved a second elastic member 410 (a spring), an engaging member 42 which is sleeved onto the release button 41 and located at and driven by one end of the second elastic member 410, and an engaging shaft 43 onto which being sleeved a third elastic member 430 (a spring). The engaging shaft 43 is disposed in the first aperture 12 of the base 10, and has two ends pushed against the first aperture 12 and a flange in the middle of the engaging shaft 43, so that the engaging shaft 43 is pushed to partially and elastically protrude out of the first aperture 12. The engaging member 42 has one end fixed to the release button 41, and another end of the engaging member 42 extends in parallel with the release button 41 and is pushed against the engaging shaft 43.

The second rotary sleeve 30 is provided at one end with a second recess 31 for receiving the release button 41, and provided at another end thereof with a receiving chamber 32 for receiving the engaging member 42 and the damper 110. At least one engaging portion 320 is formed at an opening of the receiving chamber 32 to drivingly engage with the toothed wheel of the damper 110. At the bottom of the receiving chamber 32 is eccentrically formed a positioning groove 321 for engaging with the engaging member 42. The positioning groove 321 is aligned with the engaging shaft 43. At least one second engaging groove 33 is formed on an outer surface of the second rotary sleeve 30, and at least one second inserting hole 34 and a second assembling recess 35 with a flat bottom are formed on the outer surface of the second rotary sleeve 30 and located opposite the second engaging groove 33. At the bottom of the second assembling recess 35 are provided a second protrusion 350 and a third fixing hole 351.

The angle-adjustment module 50 includes an adjustment cover 51, an adjustment rod 52, and a threaded adjustment hole 53. The adjustment rod 52 is screwed through the adjustment hole 53 to push against an adjustment portion 510 of the adjustment cover 51, so as to fix the angle after angle adjustment.

The reflecting member 60 is provided at a lower edge thereof with at least one assembling portion 61 which has a plurality of positioning apertures 610 located in alignment with the first protrusion 240, the second fixing hole 241, the second protrusion 350 and the third fixing hole 351. The first and second protrusions 240, 350 are inserted through the positioning apertures 610 to fix the reflecting member 60 to the first and second rotary sleeves 20, 30.

In this embodiment, the board 70 can be fixed the dashboard of a vehicle by double sided adhesive tape or other fixing means.

The extension portion 141 of the rotary shaft 14 is inserted in the second aperture 21 of the first rotary sleeve 20, the first rotary sleeve 20 is fixed to one side of the base 10, and the first elastic member 142 on the extension portion 141 has two ends 1421 fixed in the first fixing groove 131 of the base 10 and the second fixing groove 211 of the first rotary sleeve 20, which provides an elastic rotating force to the first and second rotary sleeves 20, 30.

The second rotary sleeve 30 is fixed to another side of the base 10 opposite the first rotary sleeve 20. The release button 41 inside the second rotary sleeve 30 is pushed by the second elastic member 410 to press the engaging member 42 into the positioning groove 321, and another end of the engaging member 42 is pushed against the end surface of the engaging shaft 43, so as to push the engaging shaft 43 partially into the positioning groove 321.

The assembling portion 61 of the reflecting member 60 is mounted in the first and second assembling recesses 24, 35, and then two screws T are inserted through the positioning apertures 610 and screwed into the second and third fixing holes 241, 351.

The first and second engaging portions 511, 512 and the first inserting portion 513 of the adjustment cover 51 are elastically inserted in the first engaging groove 22 and the first inserting hole 23 of the first rotary sleeve 20, and the second engaging groove 33 and the second inserting hole 34 of the second rotary sleeve 30, so that two ends of the adjustment cover 51 are elastically engaged with the first and second rotary sleeves 20, 30.

Figure 2:
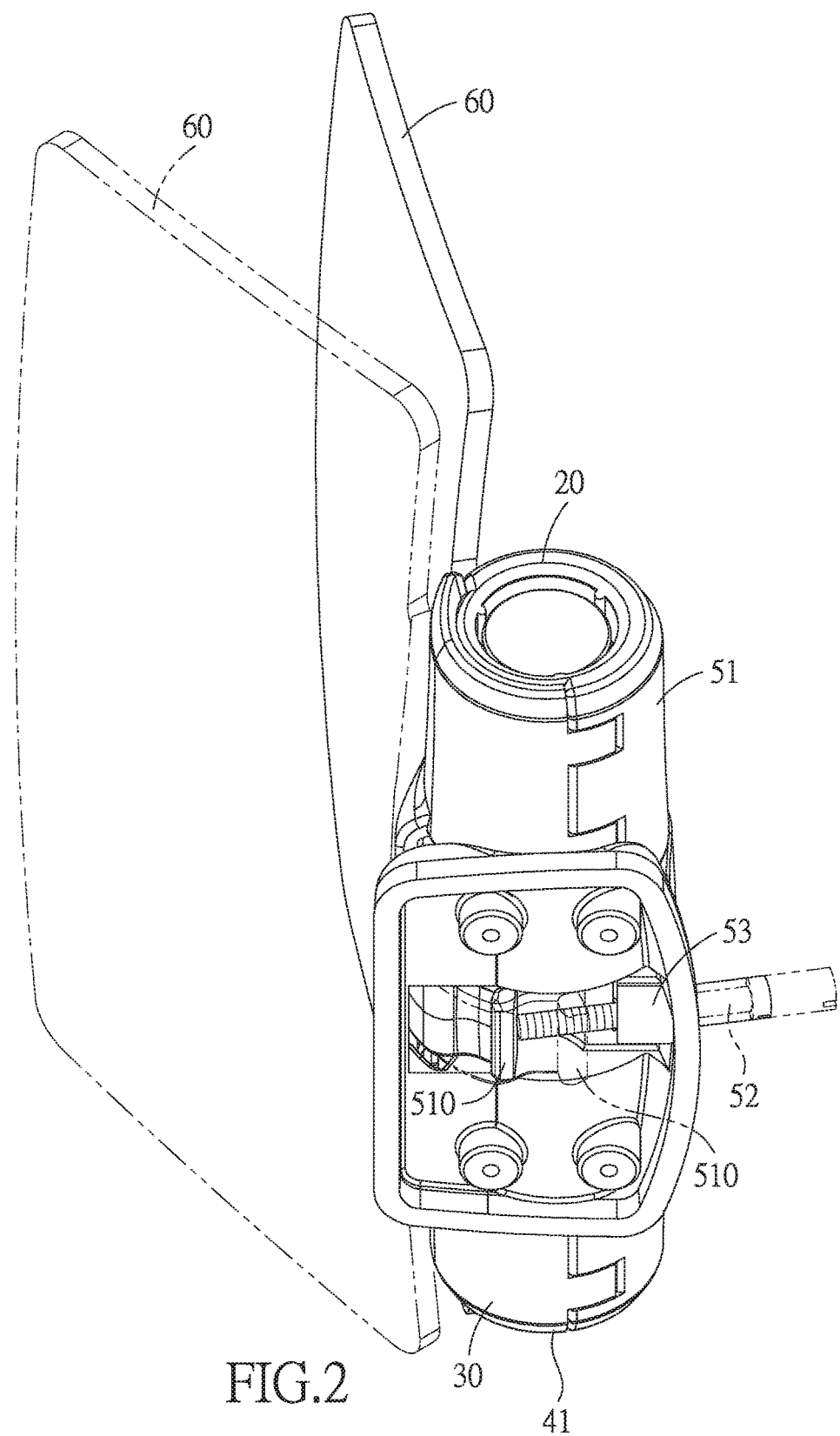
FIG. 2 is an operational view of the manually operated reflecting device in accordance with the first preferred embodiment of the present invention.

With the bottom of the base 10 fixed on the board 70, and then the board 70 is fixed to the dashboard of a vehicle, so that the user can read various vehicle information via the reflecting member 60. The present invention has the following three advantages:

Firstly, as shown in FIG. 2, the angle of the reflecting member 60 can be manually adjusted, and more specifically, adjusting the position at which the adjustment rod 52 presses against the adjustment portion 510 of the adjustment cover 51 can rotate the adjustment cover 51. When the reflecting member 60 rotates, the adjustment cover 51, and the first and second rotary sleeves 20, 30 also rotate along with the reflecting member 60 to change the angle of the reflecting member 60. Meanwhile, the rotation of the adjustment rod 52 also changes the angle of the adjustment portion 510 of the adjustment cover 51, the first and second rotary sleeves 20, 30, and the reflecting member 60, and fix them at the angle after angle adjustment.

Figure 3:
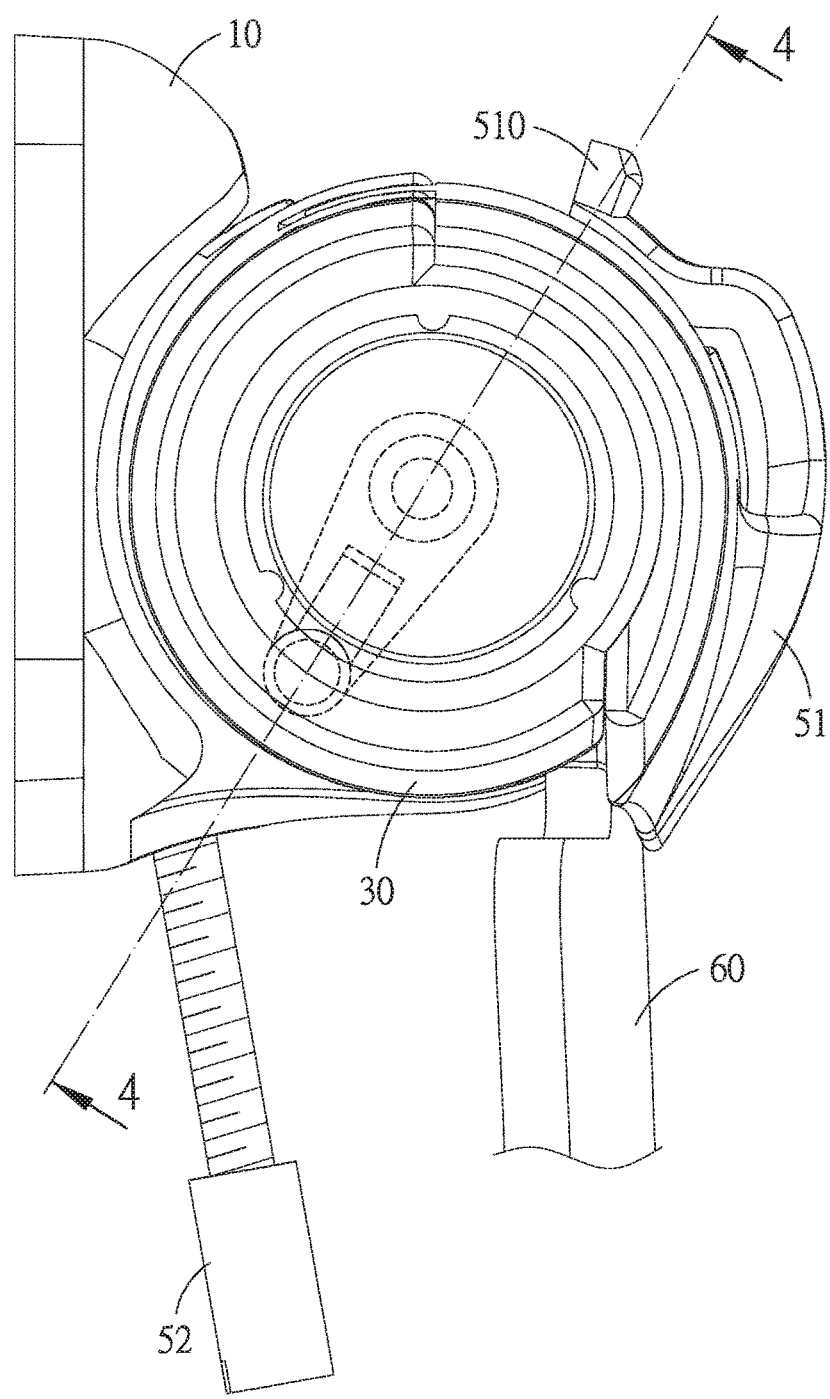
FIG. 3 is a side view of the manually operated reflecting device in accordance with the first preferred embodiment of the present invention.
Figure 4:
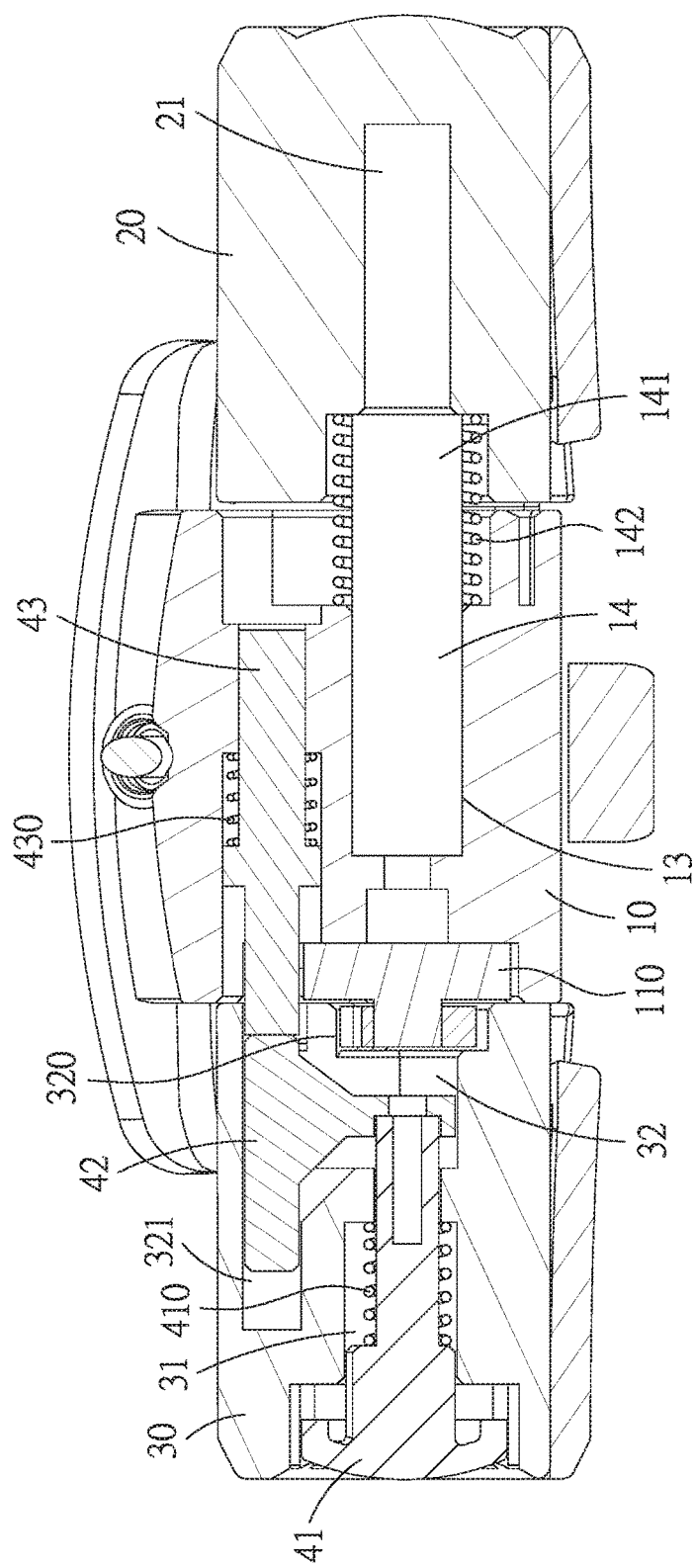
FIG. 4 is a cross sectional view taken along the line 4-4 of FIG. 3.
Figure 5:
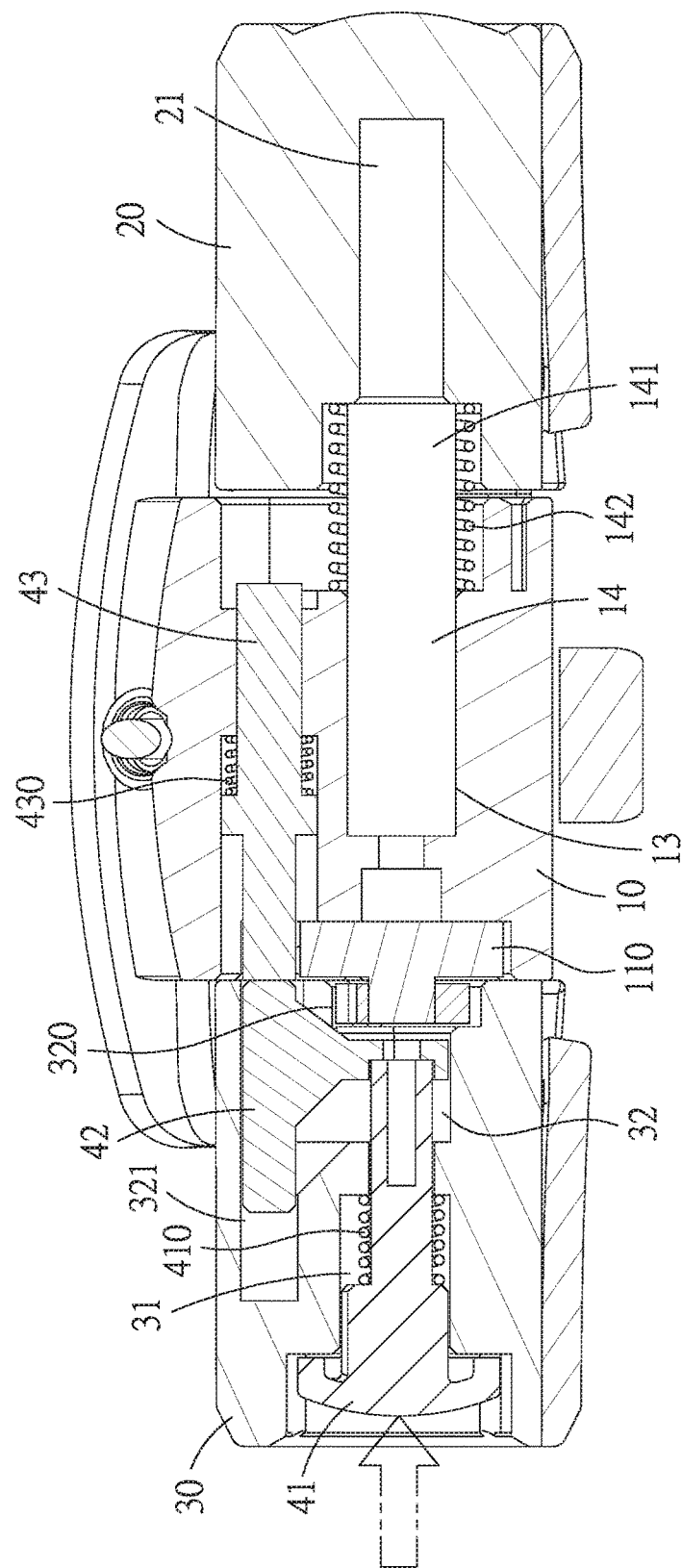
FIG. 5 is an operational cross sectional view of the manually operated reflecting device in accordance with the first preferred embodiment of the present invention.
Figure 6:
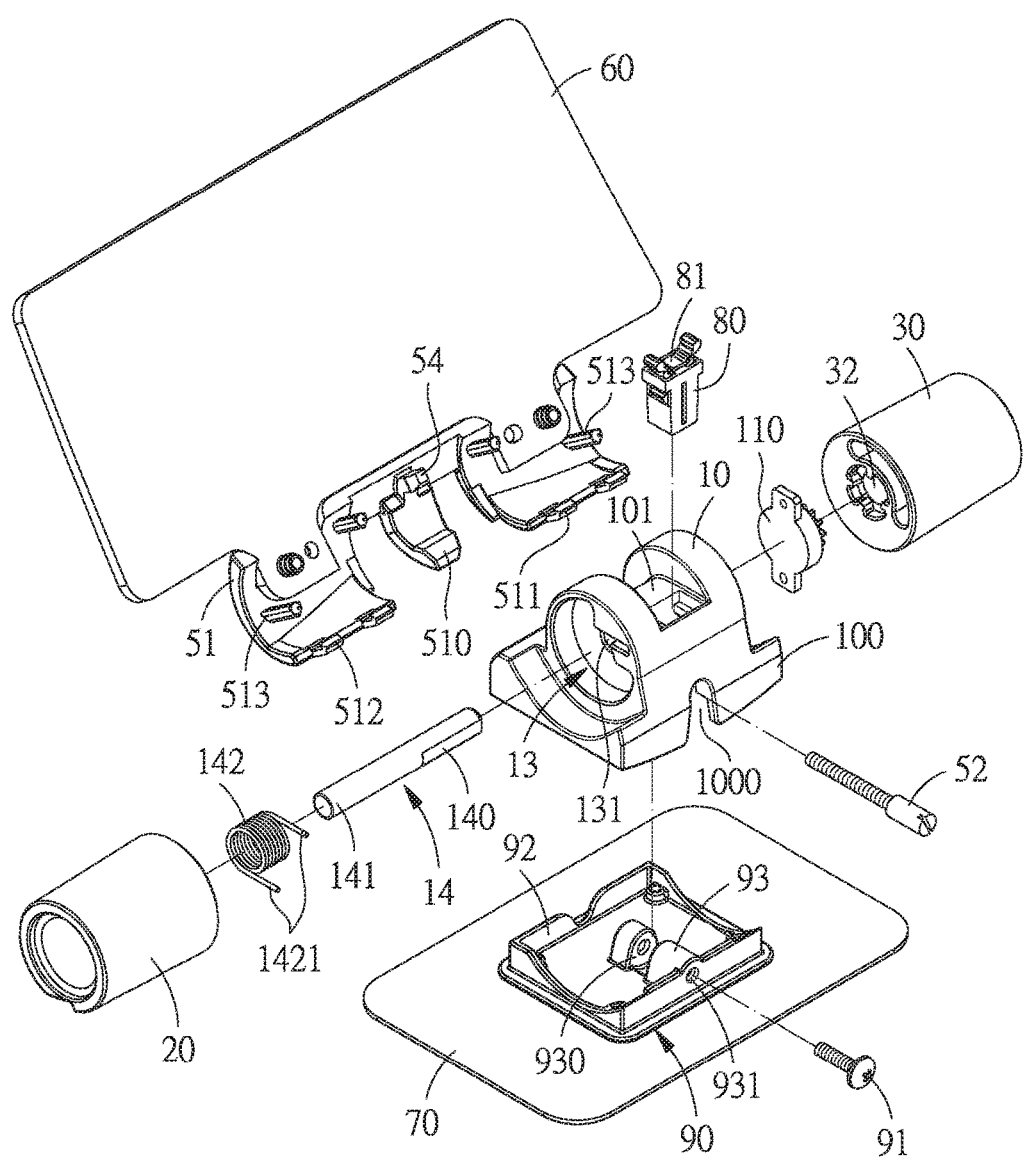
FIG. 6 is an exploded view of the manually operated reflecting device in accordance with the second preferred embodiment of the present invention.
Figure 7:
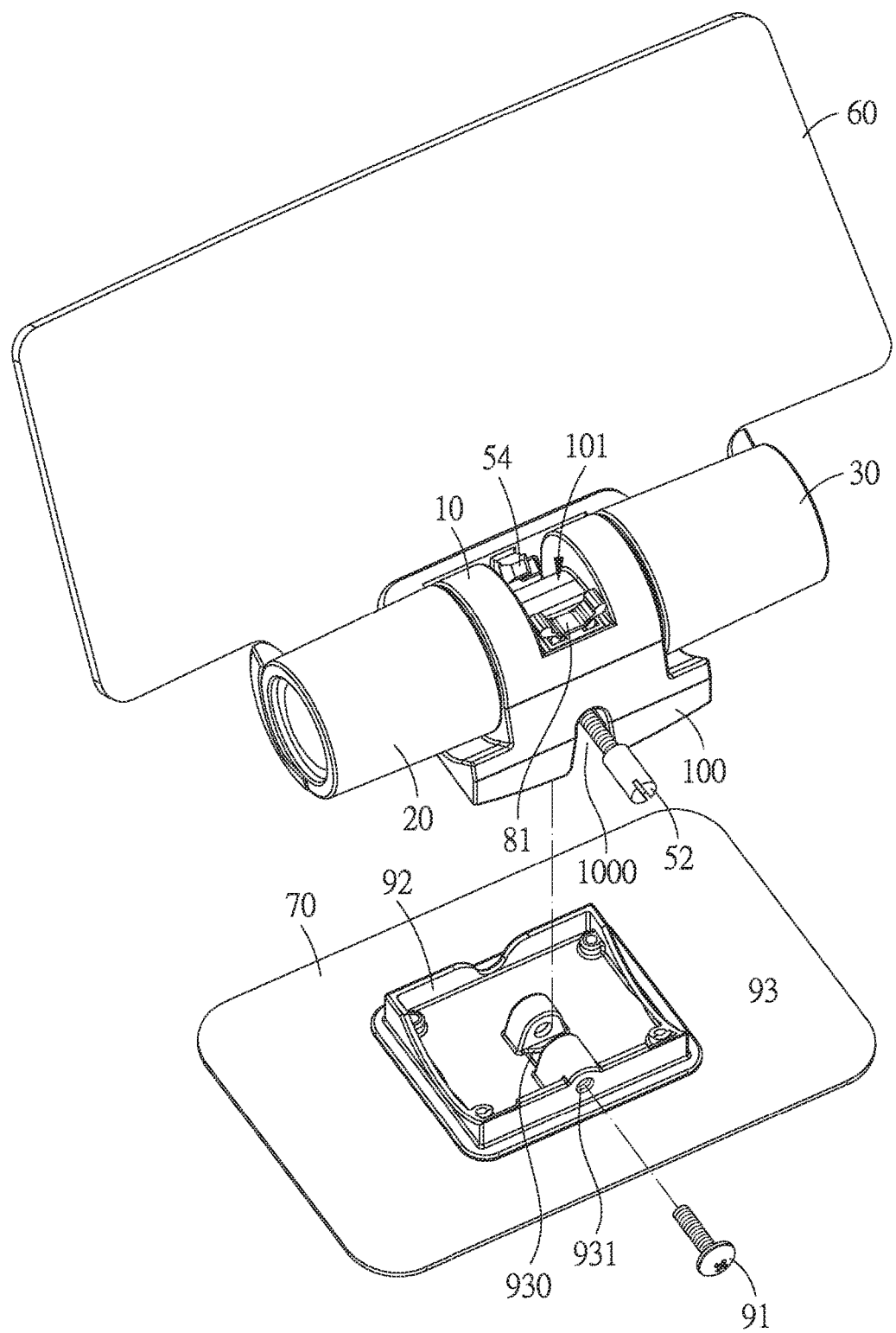
FIG. 7 is another exploded view of the manually operated reflecting device in accordance with the second preferred embodiment of the present invention.
Figure 8:
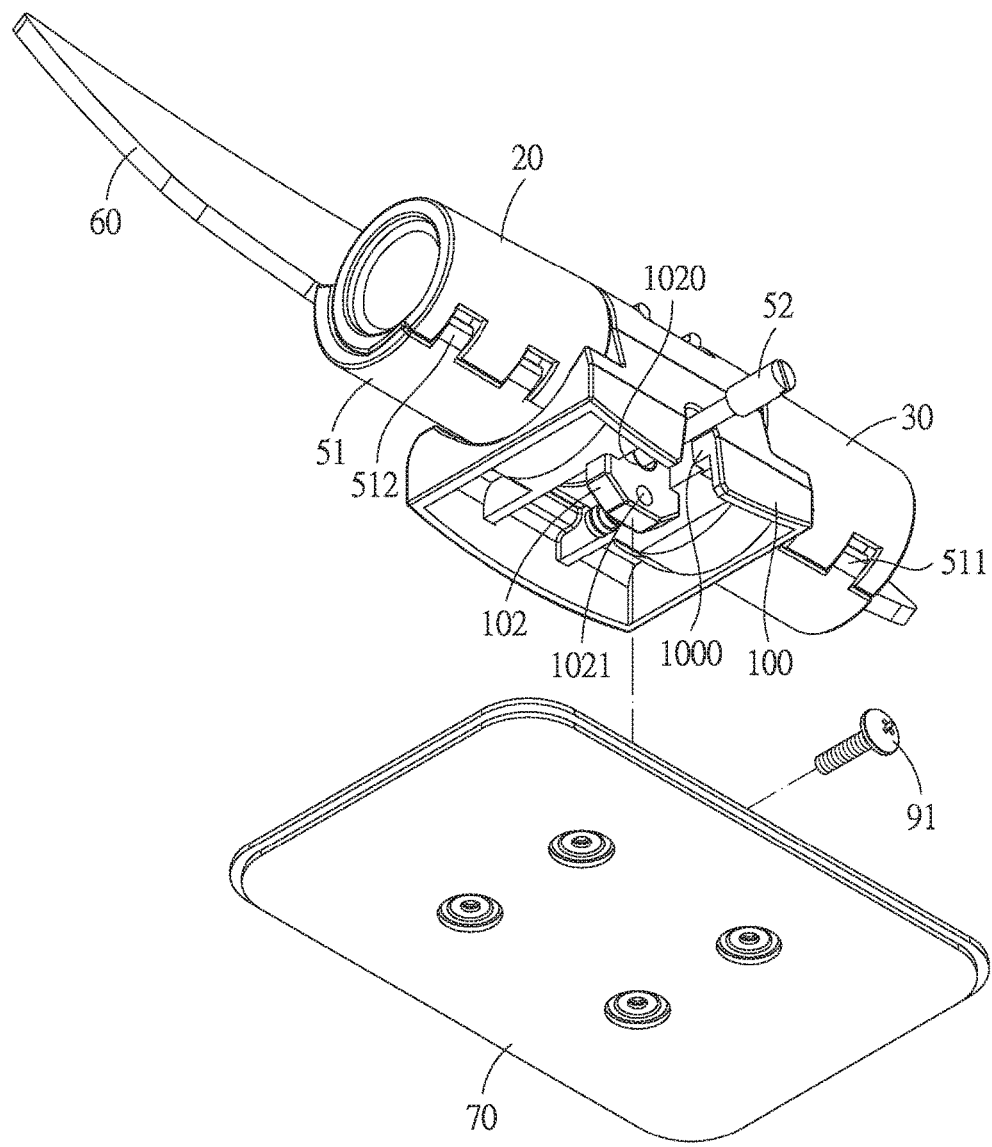
FIG. 8 is another exploded view of the manually operated reflecting device in accordance with the second preferred embodiment of the present invention.

Secondly, as shown in FIGS. 3 and 4, the reflecting member 60 can be folded when not in use, at this moment, the engaging shaft 43 of the release module 40 extends out of the first aperture 12 of the base 10 and into the positioning groove 321 of the second rotary sleeve 30, so as to prevent the second rotary sleeve 30 from rotating. When the user wants to use the reflecting member 60, as shown in FIG. 5, he/she can press the release button 41 of the release module 40, the release button 41 will push the engaging member 42, then the engaging member 42 will push the engaging shaft 43 out of the positioning groove 321, so that the first and second rotary sleeves 20, 30 can rotate the adjustment cover 51 and the reflecting member 60 by using the elastic force of the first elastic member 412. Meanwhile, the damper 110 received in the second rotary sleeve 30 can slow and smooth the rotation.

Thirdly, the angle of the reflecting member 60 is decided by the position of the adjustment rod 52 where the adjustment rod 52 presses against the adjustment portion 510 of the adjustment cover 51, when the reflecting member 60 is folded up after angle adjustment, the position of the adjustment rod 52 is still maintained at the position where the angle is adjusted. Therefore, when the user wants to use the reflecting member 60 again by pressing the release button 41, the first and second rotary sleeves 20, 30 will rotate the adjustment cover 51 and the reflecting member 60 by using the elastic force of the first elastic member 142, and the adjustment portion 510 of the adjustment cover 51 will rotate until it stops against the adjustment rod 52. In other words, the reflecting member 60 can be rotated to the same position or angle as before, so that the reflecting member 60 has a rotation angle memory function.

Referring to FIGS. 6-10, a manually operated reflecting device in accordance with a second preferred embodiment of the present invention is the same as the previous embodiment, except that:

The base 10 is provided with a concavity 1000 located toward the board 70, and the base 10 is provided at a top edge and a lower edge thereof with an opening 101, respectively.

The second rotary sleeve 30 is not provided with the release module 40, and is provided at one end thereof with a receiving chamber 32 for receiving the damper 110. At least one engaging portion 320 is formed at an opening of the receiving chamber 32 to drivingly engage with the toothed wheel of the damper 110.

A locking module 80 is disposed in the opening 101 of the base 10 and comprises: a locking portion 81 and a connecting portion 54. The locking portion 81 is disposed in the opening 101 of the base 10, and the connecting portion 54 is in the form of a square head formed at the end of the adjustment portion 510 of the adjustment cover 51. When the reflecting member 60 is not in use, the connecting portion 54 of the adjustment cover 51 is engaged with the locking portion 81 of the locking module 80. To use the reflecting member 60, the user can press the reflecting member 60 to disengage the connecting portion 54 of the adjustment cover 51 from the locking portion 81 of the locking module 80, so that the reflecting member 60 can be released from the locking position and rotated by the rotary shaft 14, then the first and second rotary sleeves 20, 30 can use the elastic force of the first elastic member 142 to rotate the adjustment cover 51 and the reflecting member 60.

Furthermore, a horizontal adjustment module 90 is disposed on the board 70 and comprises: a horizontal fixing rod 91, a pivot block 102, at least one restricting seat 92, and a horizontal connecting seat 93. The horizontal connecting seat 93 is provided with a pivot gap 930 and at least one horizontal adjustment hole 931. The restricting seat 92 is disposed around the horizontal connecting seat 93 in a protruding manner to restrict the maximum tilting angle of the base 10 in the horizontal position.

Figure 9:
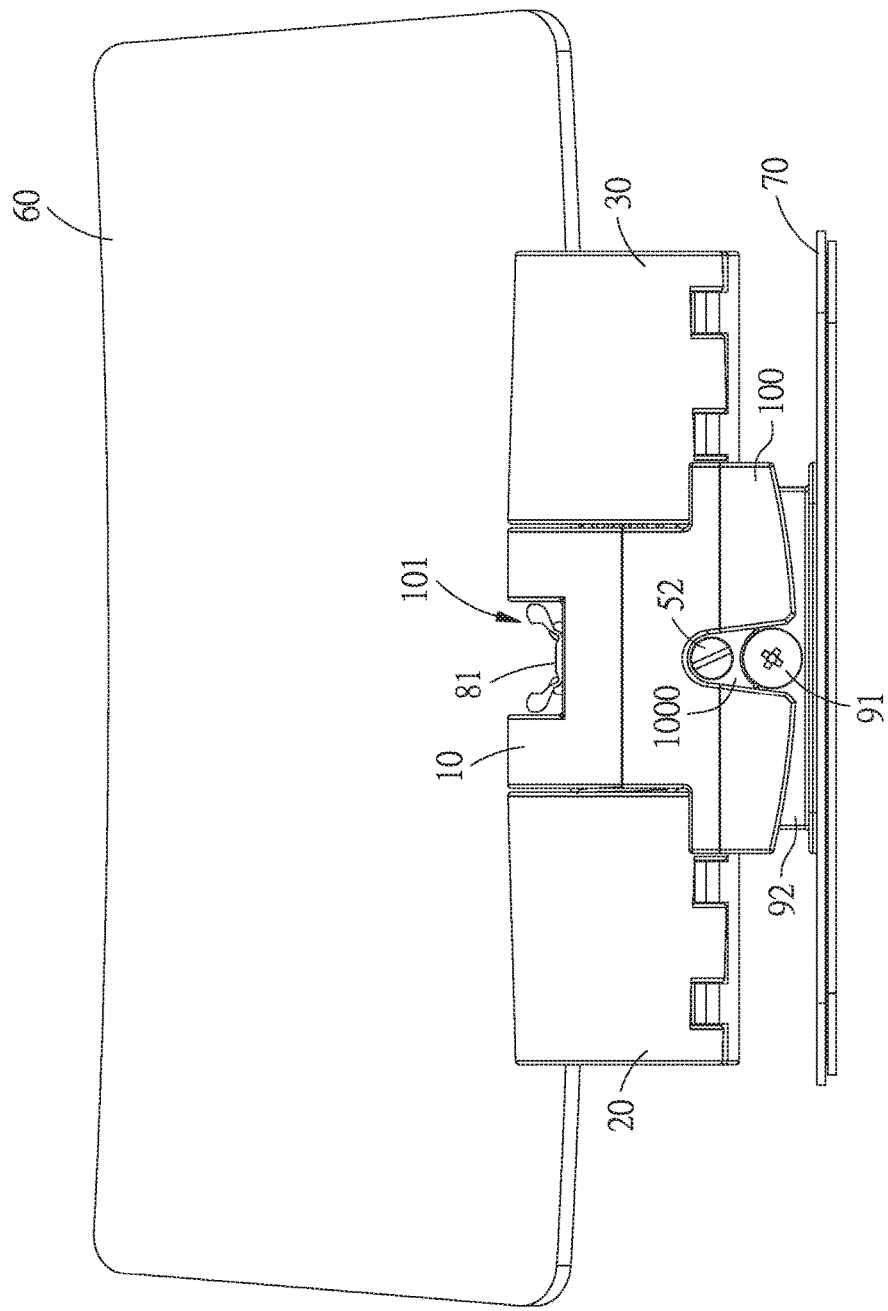
FIG. 9 is an operational view of the manually operated reflecting device in accordance with the second preferred embodiment of the present invention.

The pivot block 102 is disposed on the base 10 and provided with a first threaded hole 1020 and a pivot hole 1021. The pivot block 102 is pivotally disposed in the pivot gap 930 of the horizontal connecting seat 93, and the horizontal fixing rod 91 is inserted in the horizontal adjustment hole 931 and the pivot hole 1021 of the pivot block 102. Releasing the horizontal fixing rod 91 can move the pivot block 102 out of the pivot gap 930, so that the horizontal angle of the base 10 with respect to the horizontal connecting seat 93 can be adjusted. When the horizontal angle adjustment is done, reversely rotating the horizontal fixing rod 91 can allow the pivot block 102 to be clamped in the pivot gap 930 again, so that the horizontal angle can be fixed, as shown in FIGS. 9 and 10.

While we have shown and described various embodiments in accordance with the present invention, it is clear to those skilled in the art that further embodiments may be made without departing from the scope of the present invention.

What is claimed is:

1. A manually operated reflecting device, comprising: a base provided at one side thereof with a first rotary sleeve; a reflecting member provided at a lower edge thereof with an assembly portion which is fixed to the first rotary sleeve; an angle-adjustment module disposed on the base; and a rotary shaft including a first elastic member, the first elastic member having two ends fixed in a first fixing groove of a first fixing hole of the base and a second fixing groove of a second aperture of the first rotary sleeve, respectively, so as to provide an elastic rotating force;

wherein the rotary shaft has a first locking hole and an extension portion, and is inserted in the first fixing hole, the first elastic member is sleeved onto the extension portion of the rotary shaft, and the extension portion is inserted in the second aperture of the first rotary sleeve.

2. The manually operated reflecting device as claimed in claim 1, wherein the base is provided with a first recess on one side thereof, and a second rotary sleeve on another side thereof; a damper is fixed in the first recess, and the second rotary sleeve is provided with a receiving chamber to receive the damper, and at least one engaging portion is formed at an opening of the receiving chamber to drivingly engage with the damper.

3. The manually operated reflecting device as claimed in claim 1, wherein a second rotary sleeve is disposed at another side of the base, the angle-adjustment module includes an adjustment cover, an adjustment rod, and a threaded adjustment hole, the adjustment cover is connected to the first and second rotary sleeves, the adjustment hole is on the base, the adjustment rod is screwed through the adjustment hole to push against an adjustment portion of the adjustment cover to restrict an angle of the adjustment cover.

4. The manually operated reflecting device as claimed in claim 1, further comprising a release module which includes a release button onto which a second elastic member is sleeved, an engaging member which is sleeved onto the release button and located at one end of the second elastic member to be driven by the second elastic member, and an engaging shaft onto which a third elastic member is sleeved, the engaging shaft is disposed in a first aperture of the base, and has two ends pushed against a bottom of the first aperture and a flange in the middle of the engaging shaft, so that the engaging shaft is pushed to partially and elastically protrude out of the first aperture, the engaging member has one end fixed to the release button, and another end of the engaging member extends in parallel with the release button and is pushed against the engaging shaft.

5. A manually operated reflecting device, comprising: a base provided at a top edge thereof with an opening, and at one side thereof with a first rotary sleeve; a reflecting member provided at a lower edge thereof with an assembly portion, and the assembly portion is fixed to the first rotary sleeve; a rotary shaft including a first elastic member, the first elastic member having two ends fixed in a first fixing groove of a first fixing hole of the base and a second fixing groove of a second aperture of the first rotary sleeve, respectively, so as to provide an elastic rotating force; and a locking module disposed in the opening of the base;

wherein the rotary shaft has a first locking hole and an extension portion, and is inserted in the first fixing hole, the first elastic member is sleeved onto the extension portion of the rotary shaft, and the extension portion is inserted in the second aperture of the first rotary sleeve.

6. The manually operated reflecting device as claimed in claim 5, wherein the base is provided with a damper on one side thereof, and a second rotary sleeve on another side thereof; the second rotary sleeve is provided with a receiving chamber to receive the damper, and at least one engaging portion is formed at an opening of the receiving chamber to drivingly engage with the damper.

7. The manually operated reflecting device as claimed in claim 5, further comprising a horizontal adjustment module which comprises: a horizontal fixing rod, a pivot block, a restricting seat, and a horizontal connecting seat, the restricting seat is located around the horizontal connecting seat, the horizontal connecting seat is provided with a horizontal adjustment hole, the pivot block is disposed on the base and provided with a pivot hole, the horizontal fixing rod is inserted in the horizontal adjustment hole and the pivot hole of the pivot block to adjust horizontal angle of the base.

8. The manually operated reflecting device as claimed in claim 5, wherein a second rotary sleeve is disposed at another side of the base, an angle-adjustment module includes an adjustment cover, an adjustment rod, and a threaded adjustment hole, the adjustment cover is fixed to the first and second rotary sleeves, the adjustment hole is on the base, the adjustment rod is screwed through the adjustment hole to push against an adjustment portion of the adjustment cover to restrict an angle of the adjustment cover.

9. The manually operated reflecting device as claimed in claim 5, wherein the locking module includes a locking portion and a connecting portion, the locking portion is disposed in the opening of the base, and the connecting portion is formed on an adjustment cover which is fixed to the first rotary sleeve, and the connecting portion is engaged with the locking portion to fold up the reflecting piece.

* * * * *